UNITED STATES PATENT OFFICE.

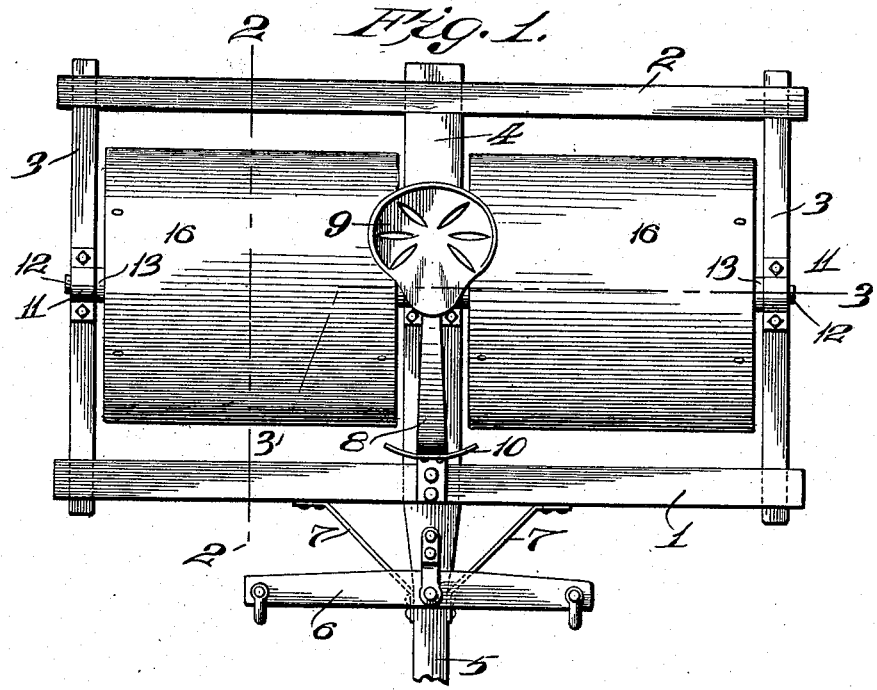
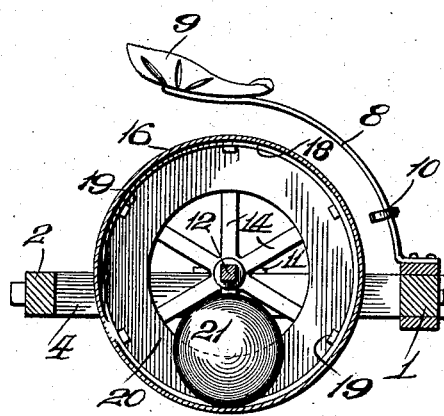
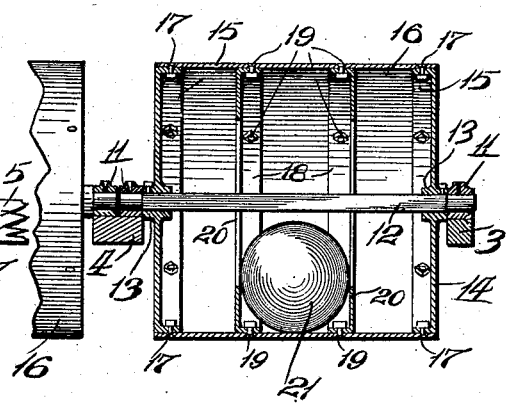

CHARLES H. SLANKARD, OF GRAYVILLE, ILLINOIS.

LAND-ROLLER.

No. 919,967.        Specification of Letters Patent.        Patented April 27, 1909.

Application filed October 30, 1908. Serial No. 460,255.

*To all whom it may concern:*

Be it known that I, CHARLES H. SLANKARD, a citizen of the United States, and resident of Grayville, White county, Illinois, have invented certain new and useful Improvements in Land-Rollers, of which the following is a specification containing a full, clear, and exact description, reference being had to the accompanying drawings, forming a part hereof.

My invention relates to a land roller, the object of my invention being to construct a simple, inexpensive land roller which is of comparatively light draft, and the rollers of which are provided with movable weights which travel between tracks fixed to the interior of the rollers.

To the above purposes, my invention consists in certain novel features of construction and arrangement of parts which will be hereinafter more fully set forth, pointed out in the claims, and illustrated in the accompanying drawings, in which:

Figure 1 is a plan view of a land roller constructed in accordance with my invention; Fig. 2 is a cross section taken on the line 2—2 of Fig. 1; and Fig. 3 is a vertical section taken on the line 3—3 of Fig. 1.

The frame of my improved land roller comprises front and rear timbers 1 and 2, end timbers 3, and center timber 4, which latter is extended forward from the frame to form a tongue 5, said tongue supporting the usual double-tree 6. Braces 7 extend between the rear portion of the tongue 5 and the front timber 1, and fixed to the central portion of the front timber 1 is an upwardly and rearwardly projecting spring 8, which carries a driver's seat 9 on its upper end, and fixed on the lower portion of the spring 8 is a foot-rest 10.

Arranged for rotation in suitable bearings 11 fixed on the central portions of the end timbers 3 and the center timber 4 is a pair of shafts 12, and rigidly fixed on each shaft, adjacent the bearings in which it operates, are hubs 13, with which are formed integral spokes 14, the outer ends of which are joined by rings or flanges 15, which project toward one another, and which fit within the ends of a cylindrical roller 16. These rings or flanges 15 are secured to the roller by bolts or rivets 17, and fitted within each roller 16 adjacent the center thereof is a pair of rings 18, which are held by means of bolts or rivets 19, and formed integral with each ring is an inwardly projecting flange 20, and the space between the two flanges of each roller forms a track for a rolling weight 21, in the form of a heavy metal ball. This ball is free to roll around the inner surface of the roller 16 between the flanges 20, and the weight of the ball is disposed on the roller 16 in a plane below the shaft carrying said roller, and as the roller moves forward the ball will naturally travel to the lowermost point on the interior of the roller.

I have shown my improved land roller as being provided with two of the rollers 16, each mounted on an independently operating shaft, which arrangement is preferable inasmuch as a roller so constructed can be readily turned in either direction in a comparatively small space without dragging upon the ground, which latter action would take place if a single long roller were made use of.

A land roller of my improved construction comprises a minimum number of parts, is of light draft, and the weight of the balls of the two rollers is very evenly distributed upon the ground.

I claim:

The herein described land roller, comprising a rectangular frame, a pair of independent shafts journaled for rotation in the frame, which shafts are in alinement with each other, hubs rigidly fixed to the ends of said shafts, spokes integral with the hubs, rings integral with the outer ends of the spokes, a cylindrical roller fixed to each pair of rings, rings fixed on the interior of each roller, flanges integral with the last mentioned rings and a ball arranged to move freely on the inner surface of each roller between the pair of flanges therein.

In testimony whereof, I have signed my name to this specification, in presence of two subscribing witnesses.

CHARLES H. SLANKARD.

Witnesses:
  JOHN EDWARDS,
  BYRD SHELTON.